(12) United States Patent
Heavyside et al.

(10) Patent No.: US 10,901,238 B2
(45) Date of Patent: Jan. 26, 2021

(54) CONTACT LENS USING INDICIA TO AID FITTING

(71) Applicant: KATT DESIGN GROUP LTD, West Vancouver (CA)

(72) Inventors: Robert Heavyside, West Vancouver (CA); John Mountford, Brisbane (AU); Randy Kojima, Vancouver (CA); Patrick J. Caroline, Forest Grove, OR (US); David J. Barreto, Maple Ridge (CA)

(73) Assignee: KATT DESIGN GROUP LTD, West Vancouver (CA)

( * ) Notice: Subject to any disclaimer, the term of this patent is extended or adjusted under 35 U.S.C. 154(b) by 121 days.

(21) Appl. No.: 15/876,085

(22) Filed: Jan. 19, 2018

(65) Prior Publication Data
US 2018/0210230 A1    Jul. 26, 2018

(30) Foreign Application Priority Data

Jan. 20, 2017   (AU) ................................ 2017900185

(51) Int. Cl.
*G02C 7/04* (2006.01)
*G02C 7/02* (2006.01)

(52) U.S. Cl.
CPC .............. *G02C 7/047* (2013.01); *G02C 7/021* (2013.01); *G02C 7/044* (2013.01)

(58) Field of Classification Search
CPC ........ G02C 7/047; G02C 7/021; G02C 7/044; G02C 7/024; G02C 7/027; G02C 7/022; G02C 7/045; G02C 7/046; G02C 7/048; G02C 7/049

USPC ............ 351/159.01, 159.02, 159.24, 159.28, 351/159.69
See application file for complete search history.

(56) References Cited

U.S. PATENT DOCUMENTS

| | | | | |
|---|---|---|---|---|
| 5,062,701 A * | 11/1991 | Drazba | ................. | G02C 7/021 351/159.69 |
| 6,042,230 A * | 3/2000 | Neadle | ................. | G02C 7/021 351/159.69 |
| 2005/0105045 A1* | 5/2005 | Legerton | ................ | G02C 7/021 351/159.02 |
| 2006/0001828 A1* | 1/2006 | Duggan | ................. | G02C 7/021 351/159.69 |

(Continued)

OTHER PUBLICATIONS

The ICD 16.5 and 14.5 Mini Scleral Lenses; Precision Technology Services, https://www.youtube.com/watch?v=MTtu4VNDWh4, Nov. 3, 2014.

(Continued)

*Primary Examiner* — William R Alexander
*Assistant Examiner* — Alberto J Betancourt
(74) *Attorney, Agent, or Firm* — Knobbe, Martens, Olson & Bear, LLP (57) ABSTRACT

A contact lens comprising one or more anatomical locating indicia comprising a length delimiting or substantially delimiting a contact lens zone is disclosed. The intended location of the anatomical locating indicia may be over or substantially over an anatomical feature. When the lens fits correctly, the intended location of the one or more anatomical locating indicia is over or substantially over and delimiting or substantially delimiting the anatomical feature. The indicia may illustrate where a zone starts and stops.

22 Claims, 7 Drawing Sheets

(56) References Cited

U.S. PATENT DOCUMENTS

2010/0128224 A1* 5/2010 Legerton .................. G02C 7/04
　　　　　　　　　　　　　　　　　　　　　　351/159.06
2014/0176900 A1* 6/2014 Applegate .............. G02C 7/027
　　　　　　　　　　　　　　　　　　　　　　351/159.02

OTHER PUBLICATIONS

Zenlens the enlightened scleral, Alden Optical, http://www.aldenoptical.com/docs/zenlens/Zenlens%ADbrochure.pdf, 2014.
Valley Contax, http://valleycontax.com/CS_pdfs/CS_Fitting_Guide.pdf, as early as 2018.
Assessing Rotation of Customized Toric Contact Lenses, Specialeyes, https://specialeyescq.com/blog/specialeyes-custom-toric-contact-lenses-and-assessing-rotation, Feb. 24, 2014.
Fitting & Patient Management Guide, VISTAKON Division of Johnson & Johnson Vision Care, Inc., http://www.acuvue.com/sites/default/files/jjvc-media_enCA/pdf/oasys_fitting.pdf, as early as 2008.
Guidelines for Successful Fitting, Paragon Vision Sciences, https://www.artoptical.com/storage/docs/NormalEyes_Guidelines_For_Successful_Fitting_5x7.pdf, 2012.

* cited by examiner

CONTACT LENS USING INDICIA TO AID FITTING

RELATED APPLICATION

This application claims priority from Australian Provisional patent application No.: 2017900185, filed 20 Jan. 2017, the subject matter of which is incorporated herein by referent in its entirety.

FIELD OF THE INVENTION

The present invention relates to a contact lens comprising one or more anatomical locating indicia. More particularly, this invention relates to a contact lens comprising one or more anatomical locating indicia comprising a length delimiting a contact lens zone.

BACKGROUND TO THE INVENTION

Contact lenses are used to correct refractive errors and other ophthalmological abnormalities including those resulting from eye diseases like keratoconus and pellucid marginal degeneration along with those caused by corneal surgery and ocular trauma.

It is important that lenses fit correctly in order to be effective and not to adversely impact on compliance. It is well known that fitting of some contact lenses is complex and requires specially trained professionals To assist in fitting, some lenses comprise indicia or markers to readily indicate to the eye care professional (ECP) where the lens is sitting on the eye. Fitting comprises orientation of the lens along with size, position and curve of the lens. Orientation means that the part of the lens that is mean to be at 0° is at or close to that position. Orientation is of particular importance with non-rotationally symmetrical lens design.

To aid fitting, measurements of ocular anatomical features, tear film evaluation and evaluation of the eye's topography may be performed. Ocular anatomical features, like the cornea, pupil, iris, limbus and sclera, are measured to gauge the required size and shape, including the topography, of the contact lens and of zones within the contact lens.

Lenses for optical correction must have a central optical zone as well as at least one outer zone to fit onto the eye. Some lenses, like scleral and mini-scleral lenses, have multiple additional zones to aid in fit. Conventional scleral and mini-scleral lenses comprise a central clearance zone, a limbal clearance zone and a scleral landing zone.

The ICD™ Toric lens, a KATT 2.0 design that is available from Paragon, features two flat meridian markers as rotation markers which allow the ECP to observe if the lens is rotationally stable over time and appears to stay in the same position. The axis of the rotation markers also provides information on orientation. These lenses, with rotation markers, have been exhibited since at least November 2014 and can be seen in this video dated February 2015: https://www.youtube.com/watch?v=MTtu4VNDWh4.

The ZENlens™ scleral lens diagnostic lenses feature drilled dots to mark the beginning of the scleral landing zone. This lens type combines these drilled dots with two drilled lines at meridians (0 and 180) and a drilled black dot(s) at meridian (270 base) for Toric APS Diagnostic lenses. These lenses also feature a laser-etched diagnostic number for positive identification (see http://www.aldenoptical.com/docs/zenlens/Zenlens-brochure.pdf).

As described in the Fitting Guide for "custom stable"™ contact lenses, available at http://valleycontax.com/CS_pdfs/CS_Fitting_Guide.pdf, flat meridian marks (page 10) and also rotation double check laser marks (page 11) are located on the scleral landing zone to aid in lens orientation. This document also shows rotation double check marks bridging the limbal clearance zone and the scleral landing zone, see pages 12 to 15. Additionally, the provision of a vertical hash mark and drill dot marker with ink designed for patients to insert at 270 (down) is described and illustrated on pages 12 and 14.

Rotation marks are also described in an entry posted in "Fitting Tips & Pearls" on Feb. 24, 2014 by SpecialEyes noting that "SpecialEyes" custom soft toric contact lenses have diagnostic marks located at three o'clock and nine o'clock (https://specialeyesqc.com/blog/specialeyes-custom-toric-contact-lenses-and-assessing-rotation/ dated 27 Jan. 2008).

Rotation marks are also used in soft contact lenses such as the ACUVUE® OASYS™ brand Contact Lens see http://www.acuvue.com/sites/default/files/jjvc-media_enCA/pdf/oasys_fitting.pdf Indicia may also be used for identification purposes. For example, Paragon NormalEyes® lenses are laser-marked in the return zone with a six-place designation giving information on base curve, return zone depth and landing zone area (Paragon NormalEyes® 15.5 Guidelines for Successful Fitting, copyright 2013, page 26, available at https://www.artoptical.com/storage/docs/NormalEyes_Guidelines-_For_Successful_Fitting_5x7.pdf)

Improvements which aid the fitting of contact lenses would be beneficial.

The reference to any prior art in this specification is not, and should not be taken as, an acknowledgement or any form of suggestion that the prior art forms part of the common general knowledge.

OBJECT OF THE INVENTION

It is a preferred object of the embodiments of the present invention to provide an apparatus that addresses or at least ameliorates one or more of the aforementioned problems of the prior art and/or provides a useful commercial alternative.

SUMMARY OF THE INVENTION

Generally, embodiments of the present invention relate to contact lenses comprising one or more indicia. Advantageously, the indicia may be used to assess the lens fit and infer changes necessary to lens clearance and/or diameter. The change to the lens clearance may be in a peripheral clearance zone and/or a limbal clearance zone.

In one form, although it need not be the only or indeed the broadest form, the invention resides in a contact lens comprising one or more anatomical locating indicia comprising a length delimiting or substantially delimiting a contact lens zone.

In one aspect of the first form, in use or when used, an intended location of the one or more anatomical locating indicia is over or substantially over an anatomical feature. When the lens fits correctly, the intended location of the one or more anatomical locating indicia is over or substantially over and delimiting or substantially delimiting the anatomical feature.

In a preferred embodiment, the anatomical feature comprises the limbus bordering the cornea and the sclera.

In a preferred embodiment the one or more anatomical locating indicia delimit a contact lens zone by starting at the beginning of the zone and ending at the end of the zone. Advantageously, the indicia illustrate where a zone starts and stops.

In a particular embodiment, the one or more anatomical locating indicia delimit a limbal clearance zone.

The one or more anatomical locating indicia delimiting the limbal clearance zone (LCZ) may extend from the end of the zone central to the LCZ to the beginning of the zone peripheral to the LCZ. The zone central to the LCZ may comprise a peripheral central clearance zone or a central clearance zone. The zone exterior to the LCZ may a scleral clearance zone or a scleral landing zone.

The one or more anatomical locating indicia may comprise one, two, three, four, five, six, seven, eight, nine, ten, eleven, twelve, thirteen, fourteen, fifteen, sixteen, seventeen, eighteen, nineteen, twenty or twenty or more indicia. In one embodiment the at least one indicia comprises six indicia.

The one or more anatomical locating indicia may be disposed at regular intervals. The regular intervals may be every 20°; every 30°; every 40°; every 45°; every 60°; every 90°; or every 180°.

The one or more anatomical locating indicia may comprise a length of 0.1 to 3.0 mm; 0.2 to 2.0 mm; or 0.5 to 0.7 mm. The length may comprise 0.1; 0.2; 0.3; 0.4; 0.5; 0.6; 0.7; 0.8; 0.9, 1.0; 1.1; 1.2; 1.3; 1.4; 1.5; 1.6; 1.7; 1.8; 1.9; 2.0; 2.1; 2.2; 2.3; 2.4; 2.5; 2.6; 2.7; 2.8; 2.9 or 3.0 mm. In a particular embodiment the length comprises 0.6 mm.

In a particular embodiment, the one or more anatomical locating indicia may extend from 5.25 mm to 5.90 mm.

In another particular embodiment the length may be used to measure or approximate the distance from an anatomical feature.

The one or more anatomical locating indicia may be comprised on a front surface of the contact lens.

Each of the one or more anatomical locating indicia may comprise a scribe mark or an annulus. The one or more anatomical locating indicia may be disposed with a lathe or a laser. The one or more anatomical locating indicia may be carved in with a milling tool. Optionally, the one or more anatomical locating indicia may be inked. When the anatomical locating indicia comprises an annulus it may comprise two annuli, one to show the start of the LCZ and the other to show the end of the LCZ.

The one or more anatomical locating indicia may be used to determine where the limbal clearance zone is in relationship to the eye.

The one or more anatomical locating indicia may be used to measure the distance from the sclera or iris border to determine a required change to lens diameter or clearance zone. The clearance zone may comprise one or more of a central clearance zone; a peripheral clearance zone and a LCZ.

The one or more anatomical locating indicia may be used together with computationally implemented algorithms to provide the necessary clearances by auto-adjusting one or more of the PCCZ; the LCZ; and a contact lens diameter.

The one or more anatomical locating indicia may comprise any shape such as a linear shape or an arcuate shape. The linear shape may comprise a bar shape such as, "|"; "/"; "-"; or "\". The arcuate shape may comprise an arc such as, "("or")". The arcuate shape may correspond with a zonal curve. From the teaching herein a skilled person is readily able to select a suitable shape for anatomical locating indicia 300.

The one or more anatomical locating indicia may comprise a broken marking; a solid marking; or a combination thereof. The broken marking may comprise dots or dashes or a combination thereof.

The one or more anatomical locating indicia may comprise a ruler or an I-bar shape.

Anatomical locating indicia 300 may also be oriented at any angle. From the teaching herein a skilled person is readily able to select a suitable angle for orientation of one or more anatomical locating indicia 300. Various anatomical locating indicia 300 on any one lens 200 may be oriented at same or a different angle.

The contact lens of the first aspect may comprise a scleral or mini-scleral lens.

The contact lens of the present invention may be used to treat a refractive error and/or an ophthalmological abnormality or condition. The ophthalmological abnormality or condition may comprise one or more of ophthalmological Bulging Corneal Transplants; Corneal Transplants; Keratoconus; Kerato-globus; Normal Cornea Shapes; Pellucid Marginal Degeneration; Post Refractive Surgeryato-globus; and general ocular health disease like dry eye.

In other forms the invention also provides, a method of treatment using the contact lens of the first form, a method of fitting a contact lens using the contact lens of the first form and a method of making a contact lens comprising the contact lens of the first aspect.

Further aspects and/or features of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention.

DETAILED DESCRIPTION OF THE INVENTION

The present invention relates to contact lenses comprising one or more indicia. The present invention is of considerable advantage because the indicia may be used to assess lens fit and infer changes necessary to lens clearance and/or diameter. The contact lens is able to do this through the novel and inventive provision of one or more anatomical locating indicia. These indicia may be used to locate with respect to anatomical features of the eye such as, the cornea, the pupil, the iris, the limbus and the sclera.

The cornea is the transparent front part of the eye that covers the iris, pupil, and anterior chamber. The cornea, with the anterior chamber and lens, refracts light, with the cornea accounting for approximately two-thirds of the eye's total optical power.

The pupil is a hole located in the centre of the iris of the eye that allows light to strike the retina The iris is a thin, circular structure in the eye, responsible for controlling the diameter and size of the pupil and thus the amount of light reaching the retina. Eye color is defined by that of the iris.

The limbus or corneal limbus is the border of the cornea and the sclera.

The sclera, also known as the white of the eye, is the opaque, fibrous, protective, outer layer of the eye containing collagen and elastic fiber.

Figure 1:
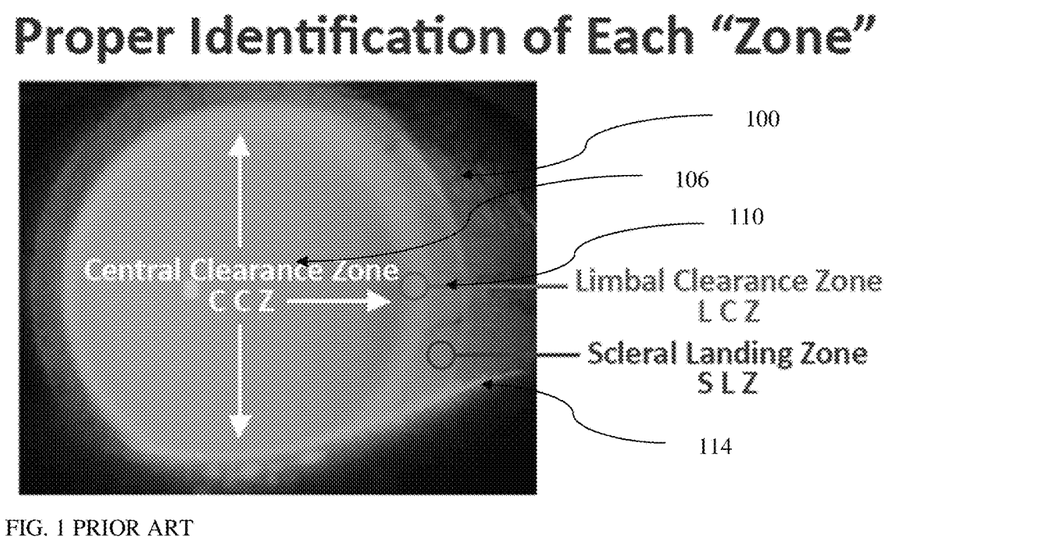
FIG. 1 is a photograph of a prior art contact lens disposed on an eye, showing the central clearance zone (CCZ), the LCZ and the scleral landing zone (SLZ).

FIG. 1 shows a prior art scleral lens 100 on which the CCZ 106, the LCZ 110 and the SLZ 114 can be seen. With the aid of fluorescein, in this case, the LCZ 110, can be detected quite readily. However, in many cases the detection of the various zones of a contact lens is not as easy, even with the aid of dyes and other visualisation aids.

Figure 2:
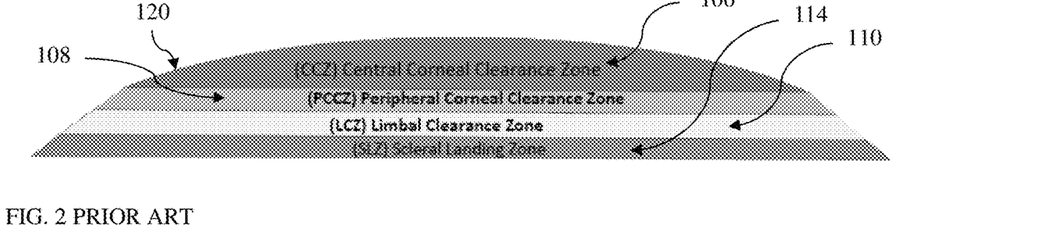
FIG. 2 is a schematic diagram of a prior art contact lens comprising a central clearance zone (CCZ), a peripheral corneal clearance zone (PCCZ), an LCZ and a SLZ.

This problem may be compounded in lenses that have additional zones, such as the prior art scleral lens 120 shown in FIG. 2 that has a CCZ 106, a LCZ 110, a SLZ 114 and additionally a peripheral corneal clearance zone (PCCZ) 108. Other lenses may have a scleral clearance zone 112 (not shown) between the LCZ 110 and SLZ 114.

Figure 3:
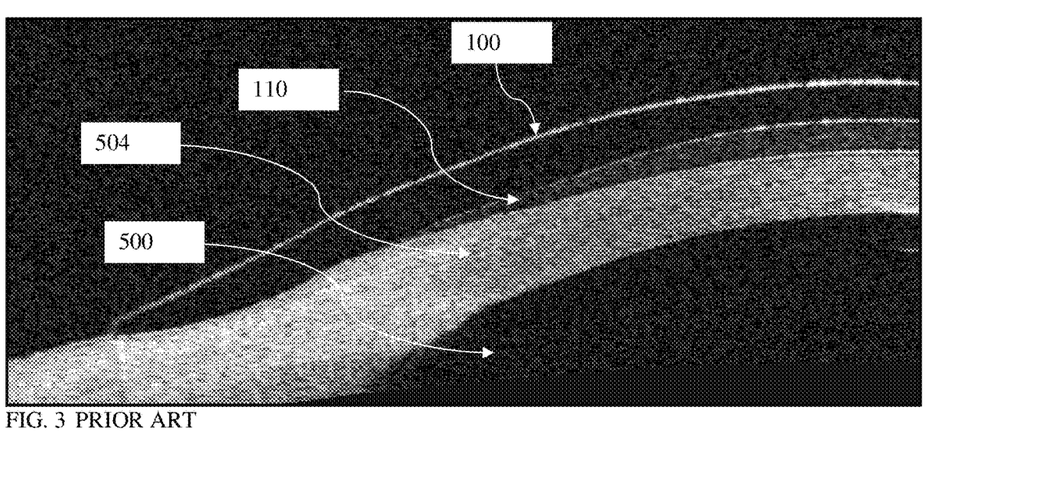
FIG. 3 is an image showing a prior art contact lens disposed on an eye and illustrates the LCZ and the limbus.

FIG. 3 is an image showing a contact lens 100 disposed on an eye 500 in which the limbus 504 and LCZ 110 are visible.

The anatomical locating indicia of the present invention find particular application to scleral lenses and will be described with reference to a scleral lens. However, the anatomical locating indicia of the invention may also find application in other contact lens types.

Figure 4:
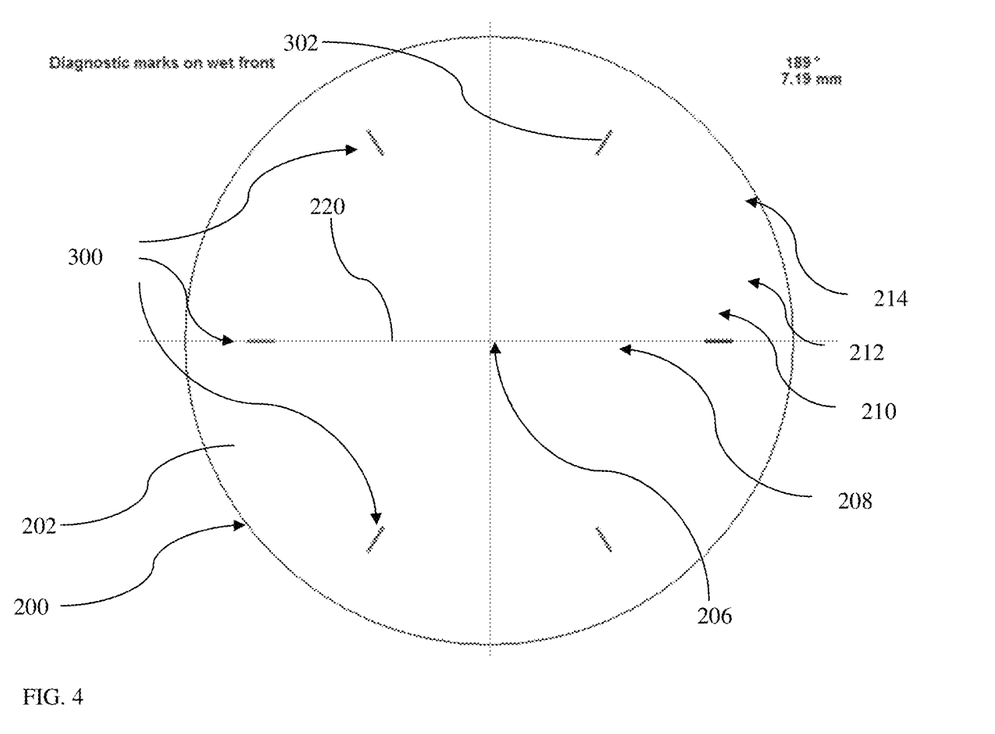
FIG. 4 is a schematic diagram of a contact lens according to the invention showing anatomical locating indicia 300

FIG. 4 shows a contact lens 200 according to one embodiment of the invention which comprises six anatomical locating indicia 300. Contact lens 200 comprises central clearance zone 206; peripheral central clearance zone 208; limbal clearance zone 210; scleral clearance zone 212; and scleral landing zone 214.

Each anatomical locating indicia 300 has a length 302 that delimits the LCZ 210.

Contact lens 200 also comprises a diameter 220, front surface 202 and back surface 204 (not shown).

When contact lens 200 is in use, an intended location of the one or more anatomical locating indicia 300 is over an anatomical feature. When the lens 200 fits correctly, the intended location of the one or more anatomical locating indicia 300 is over and delimiting the anatomical feature. In the embodiment shown in FIG. 4, the anatomical feature comprises the limbus bordering the cornea and the sclera.

The one or more anatomical locating indicia 300 delimit a contact lens zone 206, 208, 210, 212, 214 by starting at the beginning of the zone 206, 208, 210, 212, 214 and ending at the end of the zone 206, 208, 210, 212, 214. Advantageously, the anatomical locating indicia 300 illustrate where a zone 206, 208, 210, 212, 214 starts and stops.

In the embodiment shown in FIG. 4, the anatomical locating indicia 300 delimit the limbal clearance zone 210.

The one or more anatomical locating indicia 300 delimiting the limbal clearance zone (LCZ) 210, extend from the end of the zone central to the LCZ 210 to the beginning of the zone peripheral to the LCZ 210. The zone central to the LCZ 210 may comprise a peripheral central clearance zone 208 or a central clearance zone 206. The zone exterior to the LCZ 210 may a scleral clearance zone 210 or a scleral landing zone 214.

The one or more anatomical locating indicia 300 may comprise any number of individual indicia 300. For example, one, two, three, four, five, six, seven, eight, nine, ten, eleven, twelve, thirteen, fourteen, fifteen, sixteen, seventeen, eighteen, nineteen, twenty or twenty or more indicia 300 may be comprised.

The one or more anatomical locating indicia 300 may be disposed at regular intervals. The regular intervals may be every 20°; every 30°; every 40°; every 45°; every 60°; every 90°; or every 180°. The embodiment shown in FIG. 4 shows the six anatomical locating indicia 300 to be disposed at regular 60° intervals.

The one or more anatomical locating indicia may comprise a length of 0.1 to 3.0 mm; 0.2 to 2.0 mm; or 0.5 to 0.7 mm. The length may comprise 0.1; 0.2; 0.3; 0.4; 0.5; 0.6; 0.7; 0.8; 0.9, 1.0; 1.1; 1.2; 1.3; 1.4; 1.5; 1.6; 1.7; 1.8; 1.9; 2.0; 2.1; 2.2; 2.3; 2.4; 2.5; 2.6; 2.7; 2.8; 2.9 or 3.0 mm. In a particular embodiment the length comprises 0.6 mm.

Yet another advantage of the invention is that the length 302 may be used to measure or approximate the distance from an anatomical feature. That is, because the length 302 is known, the distance from or to an anatomical feature can be measured or estimated to decide how much the lens diameter 220 should be increased or decreased. In this way the one or more anatomical locating indicia 300 may be used as a ruler or calibre.

In a particular embodiment, the length 302 may extend from 5.25 mm to 5.90 mm of contact lens 200.

The one or more anatomical locating indicia 300 may be comprised on a front surface 202 of the contact lens 200.

Each of the one or more anatomical locating indicia 300 may comprise a scribe mark or an annulus. When the anatomical locating indicia 300 comprises an annulus, it may comprise two annuli, one to show the start of the LCZ 210 and the other to show the end of the LCZ.

The one or more anatomical locating indicia may be disposed with a lathe or a laser. In the embodiments shown in FIGS. 4; 5 and 7A and 7B, the one or more anatomical locating indicia 300 are carved in to lens 200 with a milling tool and then inked for ease of visualisation. Inking can also be performed with indicia 300 burnt onto lens 200 with a laser. In other embodiments, regardless of deposition of the indicia 300, the inking is not conducted.

When a scribe is used, it has the advantage of being easy to implement and distribute as part of the design files because radial scribes are directly supported by the software.

The one or more anatomical locating indicia 300 may be used to determine where the limbal clearance zone 210 or other zone 206, 208, 212, 214 is in relationship to the eye.

The one or more anatomical locating indicia 300 may be used to measure the distance from the sclera 504 or iris border to determine a required change to lens diameter or clearance zone. The clearance zone may comprise one or more of a central clearance zone 206; a peripheral clearance zone 208 and a LCZ 210.

In the event that the anatomical locating indicia 300 sits directly over or substantially over the border of the sclera 504 and the iris 502 then the ECP can be confident that the LCZ 210 is in the correct position and can make changes to the central apical clearance with confidence knowing that this change can be made without effecting the clearance in the LCZ 210. So no diameter change is needed, only the CCZ 206 would need to be adjusted to improve the overall cornea clearance and performance of the lens 200. An ECP may decide that a substantial covering of the limbus may be determined as a good fit. In one embodiment 70% may be determined as a good it.

The contact lens 200 may comprise a scleral or mini-scleral lens.

The contact lens 200 may be used to treat a refractive error and/or an ophthalmological abnormality or condition. The ophthalmological abnormality or condition may comprise one or more of ophthalmological Bulging Corneal Transplants; Corneal Transplants; Keratoconus; Kerato-globus; Normal Cornea Shapes; Pellucid Marginal Degeneration; Post Refractive Surgeryato-globus; and general ocular health disease like dry eye.

Figure 5:
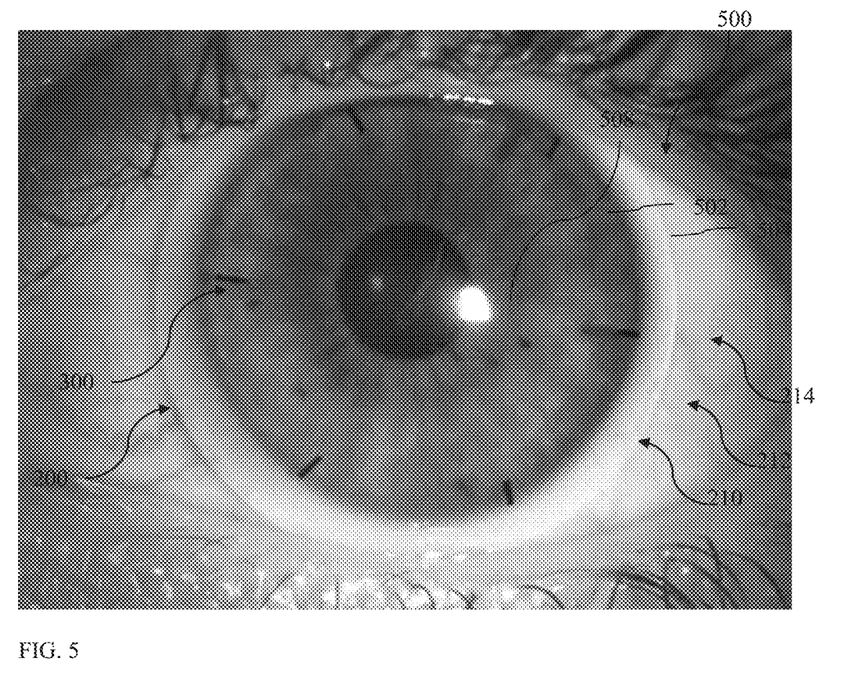
FIG. 5 is a photograph showing a contact lens according to the invention positioned on an eye.

FIG. 5 shows an image of contact lens 200 with the anatomical locating indicia 300 denoting the width of the LCZ 210. One can clearly make out the anatomical locating indicia 300 against the iris 502. Also noticeable is the end of the anatomical locating indicia 300, noting the LCZ 210/ SLZ 214 junction, aren't reaching past the limbus 504 in virtually every direction. This illustrates one of the advantages of the invention, which is that the anatomical locating indicia 300 define that this patient would need a larger lens 200 if the NaFl pattern showed peripheral corneal bearing. In other words, there would be no point in raising the LCZ 210 here to relieve the bearing on the peripheral cornea 508 and limbus 504. The lens 200 shown in FIG. 5 is too small for the eye 500 and should be increased in diameter to ensure a proper vault through the limbus 504.

Figure 6A:
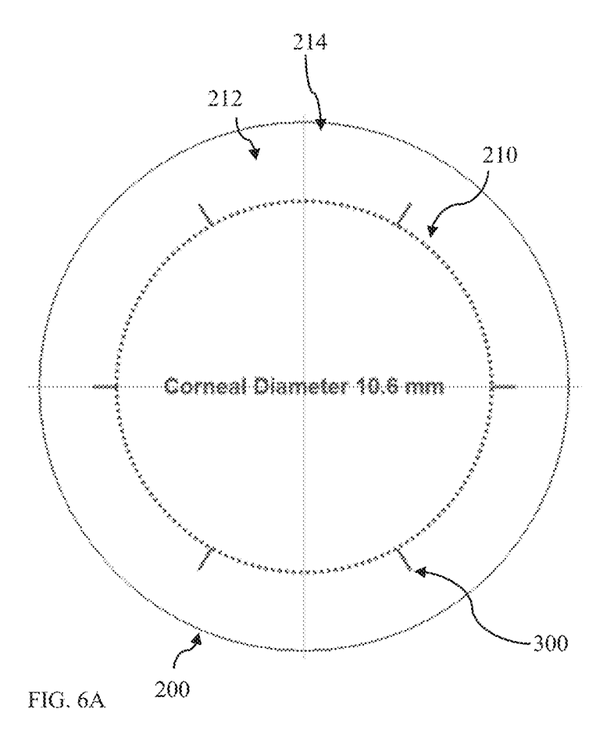
FIGS. 6A, 6C and 6C are schematic diagrams showing where the anatomical locating indicia will be positioned on eyes with varying sized corneas.
Figure 6B:
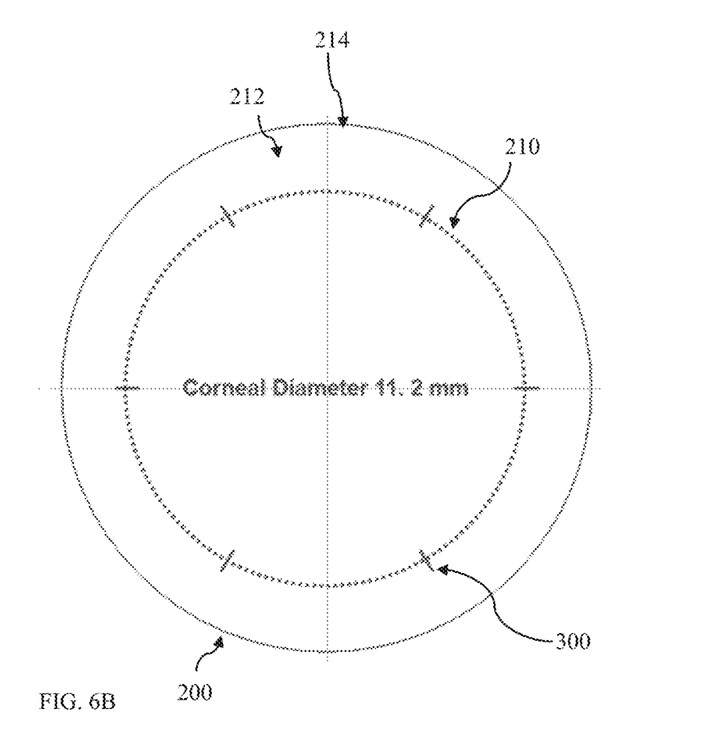
Figure 6C:
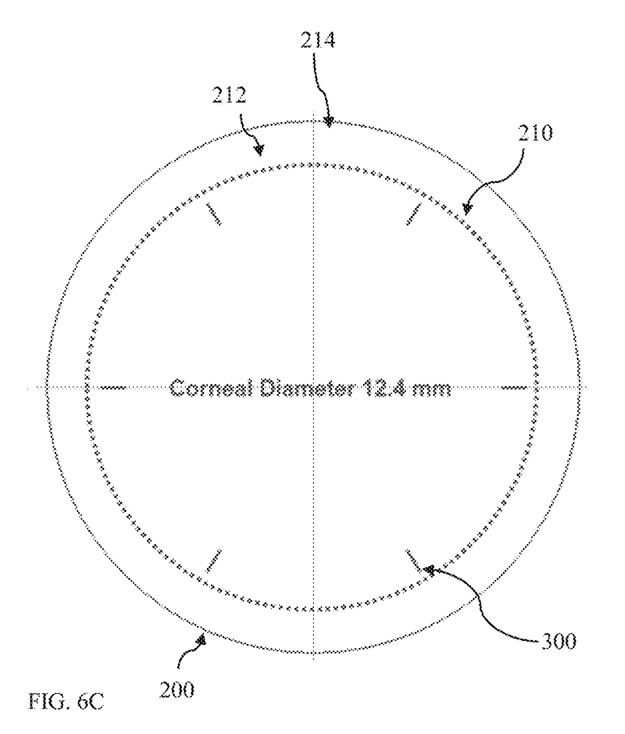

FIGS. 6A, 6B and 6C show where the anatomical locating indicia 300 are positioned with respect to varying corneal diameters: left 10.6 mm; central 11.2 mm; and right 12.4 mm.

Figure 7A:
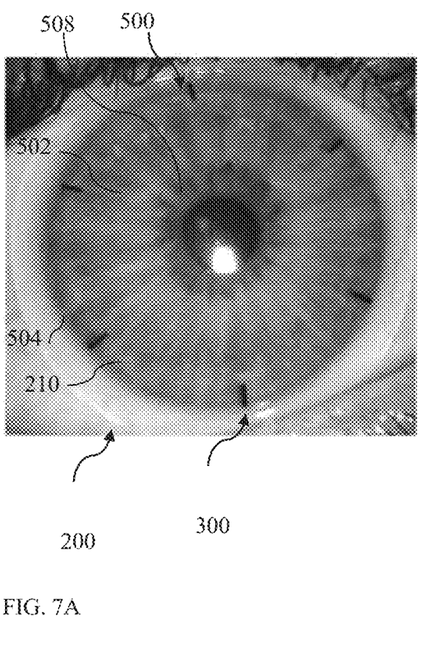
FIG. 7A is a photograph showing a contact lens according to one embodiment of the invention disposed on an eye with a corneal diameter of 12.1 mm.
Figure 7B:
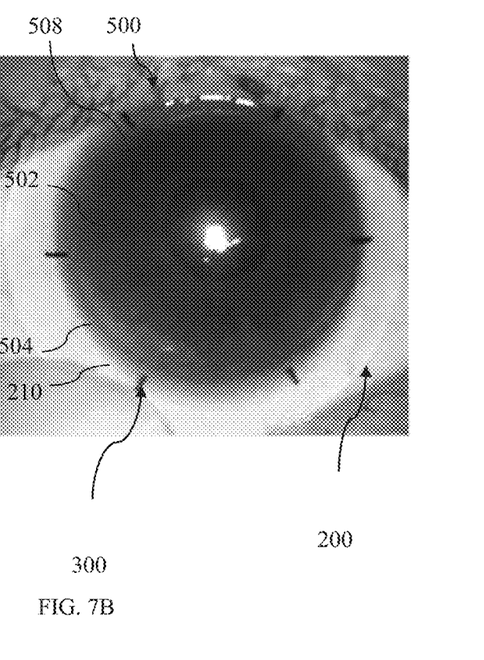
FIG. 7B is a photograph showing a contact lens according to one embodiment of the invention disposed on an eye with a corneal diameter of 11.0 mm.

FIG. 7A shows a photograph of lens 200 disposed on an eye with a 12.11 mm corneal diameter. FIG. 7B shows a photograph of lens 200 disposed on an eye 500 with a 11.00 mm corneal diameter.

Although FIGS. 4 to 7 show the anatomical locating indicia 300 to have a linear, bar shape, the invention is not so limited. The linear shape may be any bar shape such as, "|"; "/"; "-"; or "\". In other embodiments, the anatomical locating indicia may comprise any shape such as, an arcuate shape such as "("or")". The arcuate shape may correspond with a zonal curve. From the teaching herein a skilled person is readily able to select a suitable shape for anatomical locating indicia 300.

Anatomical locating indicia 300 may also be oriented at any angle. From the teaching herein a skilled person is readily able to select a suitable angle for anatomical locating indicia 300. Various anatomical locating indicia 300 on any one lens 200 may be oriented at same or a different angle.

The one or more anatomical locating indicia 300 may comprise a ruler or an I-bar shape.

When using a marking tool on the lathe, the width or thickness of the one or more anatomical locating indicia 300 is a function of the shape of the tool being used and the depth. The thickness of the one or more anatomical locating indicia 300 can be selected by selecting different tooling and settings. Additionally, the thickness of the one or more anatomical locating indicia 300 may be controlled by varying the depth of the marking tool into lens 200 to result in a thick then thin then thick anatomical locating indicia 300. For example, a longer thin shallow stroke with a few thicker short strokes can be used to create one or more anatomical locating indicia 300 comprising a ruler. In such cases, with regular ruler marks, the total length of the one or more anatomical locating indicia 300 becomes less important because you have an equivalent way of determining the fit and positioning without relying strictly on the start and end points of the one or more anatomical locating indicia 300.

The one or more anatomical locating indicia 300 may also comprise rings aligned with the start and stop points. While this is technically a bit more difficult to produce on the lathe, it has been done. The resulting rings can be used the same way to assess fit and position, with the inner ring corresponding to the inner end of the stroke, and the outer ring corresponding with the outer end of the stroke. Instead of using a complete ring, the one or more anatomical locating indicia 300 may comprise an arc segments, for example: "(";  ")", or one or more arc segment may be paired with one or more bar shape "(-".

According to the invention, if an anatomical locating indicia 300 on one side falls 75-100% inside the visible iris diameter, this indicates the diameter of lens 200 should be increased.

If an anatomical locating indicia 300 falls 50% inside the visible iris diameter and there is peripheral corneal and/or limbal bearing, then the LCZ 210 should be increased.

If the anatomical locating indicia 300 falls 100% outside the visible iris diameter and there is peripheral corneal and/or limbal bearing then the PCCZ 208 should be increased.

Another significant advantage of the present claimed invention is that it can be used together with one or more computationally implemented algorithm to provide the necessary clearance by auto-adjusting one or more of the PCCZ 208; the LCZ 210; and the diameter 220.

The lens 200 forms a light fluid suction on the eye 500 and therefore eliminates any potential for dust or other debris to get behind the lens 200. Cleaning of the lens 200 is via the same system as other lenses with for example, Boston rigid lens cleaner or similar.

The lens 200 may be made of any suitable highly oxygen permeable rigid gas permeable material such as a suitable acrylate copolymer. The lens 200 is comprised of HDS 100 material available from Paragon Vision Sciences (USA).

The invention also provides, a method of treatment using the contact lens 200, a method of fitting a contact lens using the contact lens 200 and a method of making a contact lens comprising contact lens 200.

The anatomical locating indicia 300 of the invention are a valuable reference tool for fitting, consulting and optimizing the lens outcomes.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

The claims defining the invention are as follows:

1. A scleral or mini-scleral contact lens comprising:
   one or more anatomical locating indicia comprising one or more marks on a surface of the contact lens, wherein a length of the one or more anatomical locating indicia delimits a contact lens zone,
   wherein the one or more anatomical locating indicia delimit the contact lens zone by starting at a beginning of the contact lens zone and ending at an end of the contact lens zone,
   wherein the one or more anatomical locating indicia are configured to be positioned over a limbus bordering a cornea and a sclera.

2. The scleral or mini-scleral contact lens of claim 1, wherein when the lens fits correctly, an intended location of the one or more anatomical locating indicia is over and delimiting the anatomical feature.

3. The scleral or mini-scleral contact lens of claim 1, wherein the indicia illustrate where a zone starts and stops.

4. The scleral or mini-scleral contact lens of claim 1, wherein the one or more anatomical locating indicia delimit a limbal clearance zone.

5. The scleral or mini-scleral contact lens of claim 1, wherein the one or more anatomical locating indicia delimiting the limbal clearance zone (LCZ) extends from the end of the zone central to the LCZ to the beginning of the zone peripheral to the LCZ.

6. The scleral or mini-scleral contact lens of claim 5, wherein the zone central to the LCZ is a peripheral central clearance zone or a central clearance zone.

7. The scleral or mini-scleral contact lens of claim 5, wherein a zone exterior to the LCZ is a scleral clearance zone or a scleral landing zone.

8. The scleral or mini-scleral contact lens of claim 1, wherein the one or more anatomical locating indicia comprise a length of 0.1 to 3.0 mm; 0.2 to 2.0 mm; or 0.5 to 0.7 mm.

9. The scleral or mini-scleral contact lens of claim 8, wherein the length comprises 0.1; 0.2; 0.3; 0.4; 0.5; 0.6; 0.7; 0.8; 0.9; 1.0; 1.1; 1.2; 1.3; 1.4; 1.5; 1.6; 1.7; 1.8; 1.9; 2.0; 2.1; 2.2; 2.3; 2.4; 2.5; 2.6; 2.7; 2.8; 2.9 or 3.0 mm.

10. The scleral or mini-scleral contact lens of claim 1, wherein the one or more anatomical locating indicia may extend from 5.25 mm to 5.90 mm.

11. The scleral or mini-scleral contact lens of claim 1, wherein the length may be used to measure or approximate the distance from an anatomical feature.

12. The scleral or mini-scleral contact lens of claim 1, wherein the one or more anatomical locating indicia may be comprised on a front surface of the contact lens.

13. The scleral or mini-scleral contact lens of claim 1, wherein the one or more anatomical locating indicia may comprise a scribe mark or an annulus.

14. The scleral or mini-scleral contact lens of claim 13, wherein when each of the anatomical locating indicia comprises an annulus it comprise two annuli, one to show the start of a Limbal Clearance Zone (LCZ) and the other to show the end of the LCZ.

15. The scleral or mini-scleral contact lens of claim 1, wherein the one or more anatomical locating indicia are disposed with a lathe or a laser.

16. The scleral or mini-scleral contact lens of claim 1, wherein the one or more anatomical locating indicia are configured to be identified by one or more computationally implemented algorithm to provide a necessary clearance by auto-adjusting one or more of a Peripheral Corneal Clearance Zone (PCCZ), a Limbal Clearance Zone (LCZ), and a contact lens diameter.

17. The scleral or mini-scleral contact lens of claim 1, the contact lens configured to treat a refractive error and/or an ophthalmological abnormality or condition.

18. The scleral or mini-scleral contact lens of claim 17, wherein the ophthalmological abnormality comprises one or more ophthalmological Bulging Corneal Transplants; Corneal Transplants; Keratoconus; Kerato-globus; Normal Cornea Shapes; Pellucid Marginal Degeneration; Post Refractive Surgery; and general ocular health disease like dry eye.

19. A scleral or mini-scleral contact lens comprising:
   a front surface;
   a back surface;
   a diameter; and
   one or more marks positioned on the front surface, the one or more marks configured to be positioned in a limbal clearance zone of the front surface and delimiting the limbal clearance zone by starting at a beginning of the limbal clearance zone and ending at an end of the limbal clearance zone, the limbal clearance zone configured to be positioned over a limbus bordering a cornea and a sclera of an eye.

20. The scleral or mini-scleral contact lens of claim 19, wherein the one or more marks are visible to an observer, the one or more marks configured to indicate where the scleral or mini-scleral lens is sitting on the eye.

21. The scleral or mini-scleral contact lens of claim 19, wherein the one or more marks illustrate where a zone starts and stops.

22. The scleral or mini-scleral contact lens of claim 19, wherein the one or more marks comprises a broken marking, a solid marking, or a combination thereof.

* * * * *

UNITED STATES PATENT AND TRADEMARK OFFICE
CERTIFICATE OF CORRECTION

PATENT NO. : 10,901,238 B2  
APPLICATION NO. : 15/876085  
DATED : January 26, 2021  
INVENTOR(S) : Robert Heavyside et al.

Page 1 of 1

It is certified that error appears in the above-identified patent and that said Letters Patent is hereby corrected as shown below:

On the Title Page

On Page 2, Column 1, Item (56), Line 5, under Other Publications, delete "Torie" and insert --Toric--.

On Page 2, Column 1, Item (56), Line 6, under Other Publications, delete "specialeyescq.com" and insert --specialeyesqc.com--.

In the Specification

In Column 1, Line 29, delete "professionals" and insert --professionals.--.

In Column 1, Line 51, delete "ICD™ Toric lens," and insert --ICD™Toric lens,--.

In Column 2, Line 23, delete "pdf" and insert --pdf.--.

In Column 2, Line 31, delete "pdf)" and insert --pdf).--.

In Column 3, Line 28, delete "0.9," and insert --0.9;--.

In Column 4, Line 50, delete "300" and insert --300.--.

In Column 4, Line 53, delete "6C" and insert --6B--.

In Column 5, Line 19, delete "retina" and insert --retina.--.

In Column 6, Line 31, delete "0.9," and insert --0.9;--.

In the Claims

In Column 9, Line 43, Claim 9, delete "0.9," and insert --0.9;--.

Signed and Sealed this  
Thirteenth Day of July, 2021

Drew Hirshfeld  
*Performing the Functions and Duties of the  
Under Secretary of Commerce for Intellectual Property and  
Director of the United States Patent and Trademark Office*